No. 725,147. PATENTED APR. 14, 1903.
J. P. RUARK.
SELF LOCKING BOLT.
APPLICATION FILED NOV. 18, 1902.
NO MODEL.
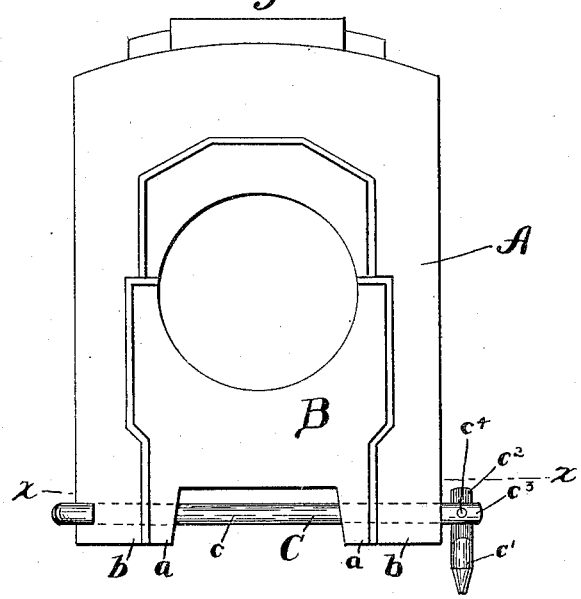
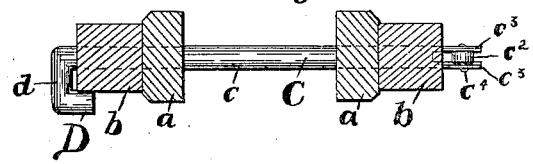
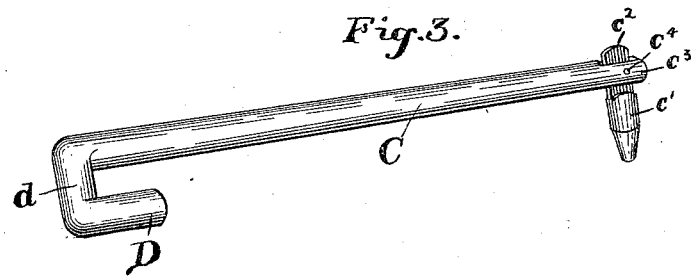

UNITED STATES PATENT OFFICE.

JOSIAH P. RUARK, OF DECATUR, ILLINOIS.

SELF-LOCKING BOLT.

SPECIFICATION forming part of Letters Patent No. 725,147, dated April 14, 1903.

Application filed November 18, 1902. Serial No. 131,843. (No model.)

*To all whom it may concern:*

Be it known that I, JOSIAH P. RUARK, a citizen of the United States, residing at Decatur, in the county of Macon and State of Illinois, have invented certain new and useful Improvements in Self-Locking Bolts, of which the following is a specification, reference being had therein to the accompanying drawings.

This invention relates to a self-locking bolt, and has for its object the provision of a bolt of this type designed particularly for use in connection with vibrating parts, the tendency of which is to unfasten a bolt, whereby the same may be accidentally withdrawn and the parts disassembled.

In attaining the foregoing object I provide a bolt which has a weighted point pivotally secured thereto and adapted to hang in a vertical position at an angle to the bolt to constitute a latch, said bolt being also provided with means for preventing turning of the same from its normal position.

Novel details in the construction and arrangement of the several parts will be apparent upon an inspection of the accompanying drawings, forming part hereof, and wherein a preferable embodiment of the invention is illustrated when read in connection with the detailed description hereinafter.

In the drawings, Figure 1 is an end elevation of a journal-box, showing the improved bolt as securing a dust-guard or similar member in place. Fig. 2 is a sectional view on the line $x\ x$ of Fig. 1, and Fig. 3 is a perspective view of the bolt removed.

Referring more specifically to the drawings, wherein like reference characters refer to corresponding parts in the several views, A designates a journal-box or other device, and B a dust-guard or the like fitting the same, each provided with alined perforated ears $a\ b$.

C designates a self-locking bolt which comprises a shank $c$, provided at its end with a weighted point $c'$, having a stem $c^2$ pivoted eccentrically between the ears $c^3\ c^3$ of the shank on the pin $c^4$. This weighted point is so formed that when the ears of the shank are in vertical position said point will automatically assume a vertical position, thereby constituting a latch or stop for preventing accidental withdrawal of the bolt. While in some instances it may be feasible to provide the bolt-shank with an ordinary head, however when the bolt is used with parts which are subjected to more or less vibration there is no provision for preventing the rocking or turning of the bolt incident to said vibration of the parts, and consequently there is great danger of the point assuming a position longitudinally of the shank when the same may slip out of place. Particularly is this true when the bolt is used upon parts of an engine or car, because the movement of the car will cause the depending weighted end or latch to swing back and forth with a tendency to assume a horizontal position in alinement with the shank of the bolt. I have, therefore, in lieu of the ordinary head, formed the head end of the shank with an offset portion $d$, carrying an integral locking lug or projection D, arranged to engage the end surface of the box A, as clearly shown in Fig. 2, said locking lug or projection being arranged at approximately right angles to the ears $c^3$ at the opposite end of the shank, whereby when said ears are in vertical position and the pivoted end or latch $c'$ is in locking position the lug or projection D will be in contact with the edge surface of the object being bolted, and will thereby effectually prevent any swinging of the latch or turning of the bolt.

It is to be understood that while a particular embodiment of the invention has been shown in the drawings it is not the intention to be limited thereto except in so far as any such limitations are contained in the appended claims, because it is obvious that many minor changes and alterations in the parts can be made without in the least departing from the spirit of the invention.

Having thus described the invention, what is claimed as new, and desired to be secured by Letters Patent, is—

1. A locking-bolt of the character described provided with a pivoted point or latch weighted to automatically assume a vertical position, and means for preventing turning of the bolt; substantially as and for the purpose described.

2. A locking-bolt of the character described provided with a pivoted point or latch weighted to automatically assume a vertical position, and means for preventing turning of the bolt comprising an offset stop at the head end of the bolt; substantially as described.

3. A locking-bolt of the character described provided with a pivotal point or latch weighted to automatically assume a vertical position, and means for preventing turning of the bolt comprising an offset portion at the head end of the bolt, and a stop or lug carried by said offset portion; substantially as described.

In testimony whereof I affix my signature in presence of two witnesses.

JOSIAH P. RUARK.

Witnesses:
ED. S. DAY,
ED. LYONS.